(12) United States Patent
Gabale et al.

(10) Patent No.: US 11,966,929 B2
(45) Date of Patent: Apr. 23, 2024

(54) SYSTEM AND METHOD FOR QUANTIFYING BRAND VISIBILITY AND COMPLIANCE METRICS FOR A BRAND

(71) Applicant: INFILECT TECHNOLOGIES PRIVATE LIMITED, Bengaluru (IN)

(72) Inventors: Vijay Gabale, Bengaluru (IN); Anand Prabhu Subramanian, Bengaluru (IN)

(73) Assignee: INFILECT TECHNOLOGIES PRIVATE LIMITED, Bengaluru (IN)

( * ) Notice: Subject to any disclaimer, the term of this patent is extended or adjusted under 35 U.S.C. 154(b) by 315 days.

(21) Appl. No.: 17/428,599

(22) PCT Filed: Jan. 20, 2020

(86) PCT No.: PCT/IN2020/050056
§ 371 (c)(1),
(2) Date: Aug. 4, 2021

(87) PCT Pub. No.: WO2020/161732
PCT Pub. Date: Aug. 13, 2020

(65) Prior Publication Data
US 2022/0129911 A1 Apr. 28, 2022

(30) Foreign Application Priority Data
Feb. 5, 2019 (IN) .............. 201941004531

(51) Int. Cl.
*G06Q 30/00* (2023.01)
*G06Q 30/018* (2023.01)
*G06Q 30/0204* (2023.01)
*G06V 20/62* (2022.01)

(52) U.S. Cl.
CPC ....... *G06Q 30/018* (2013.01); *G06Q 30/0204* (2013.01); *G06V 20/62* (2022.01)

(58) Field of Classification Search
None
See application file for complete search history.

(56) References Cited

U.S. PATENT DOCUMENTS

| | | | |
|---|---|---|---|
| 2008/0235077 A1* | 9/2008 | Harkness | G06Q 30/02 705/7.29 |
| 2008/0306787 A1* | 12/2008 | Hamilton | G06Q 10/0639 705/7.38 |
| 2011/0066458 A1* | 3/2011 | Dale | G06Q 30/02 705/1.1 |
| 2017/0262475 A1* | 9/2017 | Dhua | G06V 10/44 |
| 2018/0061116 A1* | 3/2018 | Mitchell | G06F 3/011 |
| 2019/0087973 A1* | 3/2019 | Kaehler | G06N 3/04 |

\* cited by examiner

*Primary Examiner* — Matthew T Sittner

(57) ABSTRACT

A system for recognizing a plurality of assets in an environment, determining a brand associated with each of the plurality of assets using a deep neural networking model, and computing a brand visibility and a compliance metric for the brand is provided, The system (i) determines a location of a plurality of assets and type of each of the plurality of assets within the media content, (ii) determines a brand and at least one object from the brand associated with each of the plurality of assets, (iii) determines at least one attribute of the at least one determined object associated with the brand, (v) implements at least one compliance rule to the at least one attribute of the at least one object, (vi) automatically determines a brand visibility and a compliance metric for the brand within the environment based on attention sequence and heatmap corresponding to the media content.

20 Claims, 5 Drawing Sheets

SYSTEM AND METHOD FOR QUANTIFYING BRAND VISIBILITY AND COMPLIANCE METRICS FOR A BRAND

BACKGROUND

Technical Field

The embodiments herein generally relate to a system and method for recognizing and analyzing one or more assets in an environment to determine a brand associated with the assets in the environment by using neuro marketing or shopper psychology principles, and more specifically to a system and method for quantifying brand visibility and compliance metric for the brand in the environment based on the analysis of the assets, analysis of heatmaps and analysis of attention sequences of the assets associated with the environment.

Description of the Related Art

Advertisement is an important marketing strategy that greatly influences the sale of products. Hence, advertisers and marketers of CPG/digital brands compete for advertising spots inside and outside a single or multi-brand retail store. Though, manufacturers spend a large amount of money in purchasing display space in a retail store for their product displays, they do not have adequate ways to ensure that the retail store is effectively merchandising their products through displays for the money they have spent on retail space for marketing. Effectiveness of displayed advertisements in these spots in terms of absolute and relative brand visibility as well as compliance to service level agreements needs to be understood for framing effective marketing strategies.

It is very difficult and cumbersome for human auditors to audit retail stores and check the display compliance. Further, manual auditing are performed on a sample basis and the results are projected based on the sample which may results in incurate results. Existing automated methods do quantify visibility, compliance, and effectiveness of brand displays on different assets such as facade, glowsign-board, standees using a photo or video taken inside or outside a single or multi-brand environment. Existing automated methods to analyse the brand display effectiveness and compliance do not parse a photo or a video taken inside or outside a single or a multi-brand environment to extract a fine level of details such as a position of a brand and a logo or a color and a size of a text. Such level of information helps to quantify the brand visibility and compliance effectively.

Accordingly, there remains a need for a system and method for recognizing and analyzing a plurality of display asset in a single-brand or a multi-brand retail environment, and for quantifying CPG/digital brand visibility, compliance, competition scores taking into account different instore and outside-store advertisement display spots accompanied by visual attention heatmap and visual attention sequencing evidences.

SUMMARY

In view of the foregoing, an embodiment herein provides a processor-implemented method for recognizing a plurality of assets in an environment and determining a brand associated with each of the plurality of assets using a deep neural networking model, and computing a brand visibility and a compliance metric for the brand in the environment. The method includes steps of: (i) generating a database with a media content associated with an environment; (ii) determining a location of a plurality of assets within the media content associated with the environment; (iii) determining a type of each of the plurality of assets within the media content, (iv) determining, using a deep neural networking model, a brand from each of the plurality of assets; (v) determining at least one object from the brand associated with each of the plurality of assets; (vi) determining at least one attribute of the at least one determined object associated with the brand within the environment using the deep neural networking mode; (vii) implementing at least one compliance rule to the at least one attribute of the at least one object to determine at least one of a placement of the brand in the asset, a placement of the brand along with other brands in the asset, a number of words in the text, a size of the brand logo or the brand name, a location of the brand logo or the brand name, a color contrast of the brand with respect to the environment, or a distinctness of the brand; (viii) generating an attention sequence and heatmap for the media content associated with the environment using the deep neural networking model; and (ix) automatically determining a brand visibility and a compliance metric for the brand within the environment by (a) determining a number of brands in each of the plurality of asset, (b) determining an area occupied by each brand in the plurality of asset, (c) computing a compliance score for displaying the brand within the environment using on the at least one compliance rule, and (d) computing an attraction score and the brand visibility for the brand based on the attention sequence and the heatmap obtained corresponding to the media content.

In some embodiments, the media content is captured using a camera or a virtual reality device and the media content includes at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment.

In some embodiments, the at least one object comprises at least one of a brand name, a brand logo, a text, a product, or a brand specific object. In some embodiments, the deep neural networking model is trained using a plurality of design creatives taken at a plurality of instances corresponding to a plurality of brands. In some embodiments, the at least one attribute comprises a color, a color contrast, a location of the object, a text size, or a number of words in the text.

In some embodiments, the at least one compliance rule includes at least one of a placement compliance rule, a location compliance rule, a text compliance rule, a color compliance rule, or a size compliance rule. In some embodiments, the attention sequence includes a sequence number for one or more pixel in the media content and the heatmap includes a heat for one or more different color of the one or more pixels in the media content.

In some embodiments, the media content comprising the video of the asset or the video of at least one of the physical retail store environments, the digital retail store environment, the virtual reality store environment, the social media environment or the web page environment is parsed to extract one or more images.

In some embodiments, the attention sequence is generated using the numbering of each pixel of the media content and the attention heatmap is generated using different heat colors of the one or more pixels in the media content associated with the environment.

In some embodiments, the media content is converted into a three-dimensional model, when the media content is received from the digital retail store environment or the virtual reality store environment.

In some embodiments, the media content comprises an image or a video or three-dimensional model associated with at least one of an inside or an outside of the environment.

In one aspect, one or more non-transitory computer readable storage mediums storing instructions, which when executed by a processor, a method of automatic recognition of a plurality of assets in an environment using an image recognition technique, determination of a brand associated with each of the plurality of assets using a deep neural networking model, and computation of a brand visibility and a compliance metric for the brand in the environment is provided. The method comprises the steps of: (i) generating a database with a media content associated with an environment; (ii) determining a location of a plurality of assets within the media content associated with the environment; (iii) determining a type of each of the plurality of assets within the media content; (iv) determining, using a deep neural networking model, a brand from each of the plurality of assets; (v) determining at least one object from the brand associated with each of the plurality of assets; (vi) determining at least one attribute of the at least one determined object associated with the brand within the environment using the deep neural networking model; (vii) implementing at least one compliance rule to the at least one attribute of the at least one object to determine at least one of a placement of the brand in the asset, a placement of the brand along with other brands in the asset, a number of words in the text, a size of the brand logo or the brand name, a location of the brand logo or the brand name, a color contrast of the brand with respect to the environment, or a distinctness of the brand; (viii) generating an attention sequence and heatmap for the media content associated with the environment using the deep neural networking model; and (ix) automatically determining a brand visibility and a compliance metric for the brand within the environment by (a) determining a number of brands in each of the plurality of asset, (b) determining an area occupied by each brand in the plurality of asset, (c) computing a compliance score for displaying the brand within the environment using on the at least one compliance rule, and (d) computing an attraction score and the brand visibility for the brand based on the attention sequence and the heatmap obtained corresponding to the media content.

In some embodiments, the media content is captured using a camera or a virtual reality device and the media content includes at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment.

In some embodiments, the at least one object comprises at least one of a brand name, a brand logo, a text, a product, or a brand specific object. In some embodiments, the deep neural networking model is trained using a plurality of design creatives taken at a plurality of instances corresponding to a plurality of brands. In some embodiments, the at least one attribute comprises a color, a color contrast, a location of the object, a text size, or a number of words in the text.

In some embodiments, the at least one compliance rule includes at least one of a placement compliance rule, a location compliance rule, a text compliance rule, a color compliance rule, or a size compliance rule. In some embodiments, the attention sequence includes a sequence number for one or more pixel in the media content and the heatmap includes a heat for one or more different color of the one or more pixels in the media content.

In some embodiments, the media content comprising the video of the asset or the video of at least one of the physical retail store environments, the digital retail store environment, the virtual reality store environment, the social media environment or the web page environment is parsed to extract one or more images.

In some embodiments, the attention sequence is generated using the numbering of each pixel of the media content and the attention heatmap is generated using different heat colors of the one or more pixels in the media content associated with the environment.

In some embodiments, the media content is converted into a three-dimensional model, when the media content is received from the digital retail store environment or the virtual reality store environment.

In some embodiments, the media content comprises an image or a video or three-dimensional model associated with at least one of an inside or an outside of the environment.

In another aspect, a system for automatically recognizing a plurality of assets in an environment using an image recognition technique, determining a brand associated with each of the plurality of assets using a deep neural networking model, and computing a brand visibility and a compliance metric for the brand in the environment is provided. The system includes a memory, and a device processor. The memory includes a database that stores a media content associated with the environment. The media content is captured using a camera or a virtual reality device. The media content includes at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment. The database stores one or more modules executable by the device processor. The set of modules includes (i) a database generation module that generates a database of media content associated with the environment; (ii) an asset determination module that determines (a) a location of a plurality of assets within the media content associated with the environment, and (b) a type of each of the plurality of assets within the media content; (iii) a brand determination module that determines a brand from each of the plurality of assets using a deep neural network model; (iv) an object recognition module that determines at least one object from the brand associated with each of the plurality of assets; (v) an attribute determination module that determines at least one attribute of the at least one determined object associated with the brand within the environment using the deep neural networking model; (vi) a compliance rule implementation module that implements at least one compliance rule to the at least one attribute of the at least one object to determine at least one of a placement of the brand in the asset, a placement of the brand along with other brands in the asset, a number of words in the text, a size of the brand logo or the brand name, a location of the brand logo or the brand name, a color contrast of the brand with respect to the environment, or a distinctness of the brand; (vii) a heatmap generation module that generates an attention sequence and heatmap for the media content associated with the environment using the deep neural networking model; and (viii) a computation module that determines a brand visibility and a compliance metric for the brand within the environment, wherein the determining of the brand visibility and the compliance metric comprising (a) determining a number of brands in each of the plurality of asset, (b) determining an area occupied by each brand in the plurality of asset, (c) computing a compliance score for displaying the brand within the environment using on the at least one compliance rule, and (d) computing an attraction score and the brand visibility for the brand based on the attention sequence and the heatmap obtained corresponding to the media content.

The media content may be captured using a camera or a virtual reality device, wherein the media content comprises at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment. In some embodiments, the at least one object comprises at least one of a brand name, a brand logo, a text, a product or a brand-specific object. In some embodiments, the deep neural networking model is trained using one or more design creatives taken at one or more instances corresponding to one or more brands. In some embodiments, the at least one attribute includes a color, a color contrast, a location of the object, a text size, or a number of words in the text. In some embodiments, the at least one of a placement compliance rule, a location compliance rule, a text compliance rule, a color compliance rule, or a size compliance rule. In some embodiments, the attention sequence includes a sequence number for one or more pixel in the media content and the heatmap includes a heat for one or more different color of the one or more pixels in the media content.

In some embodiments, the one or more modules comprises a parsing module that automatically extracts a plurality of images by parsing the media content when the media content comprises the video of the asset or the video of at least one of the physical retail store environments, the digital retail store environment, the virtual reality store environment, the social media environment or the web page environment.

In some embodiments, the heatmap generation module generates (a) the attention sequence using the numbering of each pixel of media content, and (b) the attention heatmap using different heat colors of the plurality of pixels in the media content associated with the environment.

In some embodiments, the media content is converted into a three-dimensional model when the media content is received from the digital retail store environment or the virtual reality store environment.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
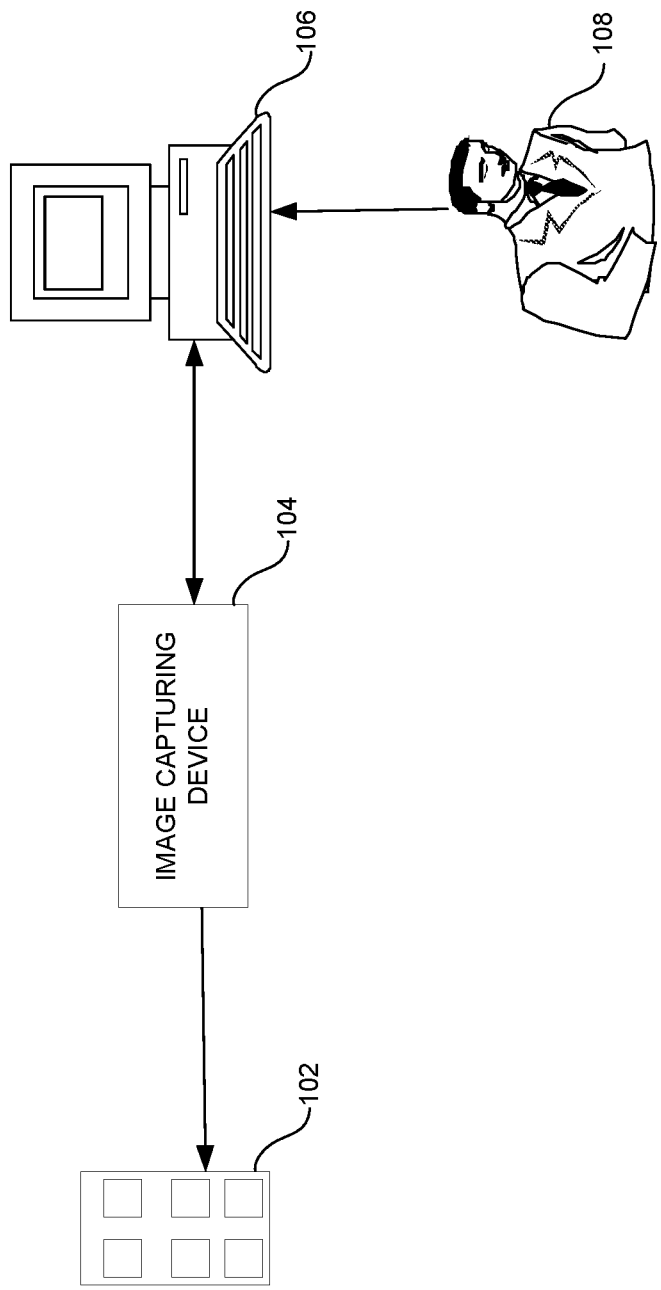
FIG. 1 illustrates a system view of a brand visibility and compliance metric quantification system for evaluating and analyzing a brand associated with an environment according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for recognizing and analyzing a plurality of objects in a design creative to generate a modified design creative based on the heatmaps and the attention sequence corresponding to the design creative. Referring now to the drawings, and more particularly to FIGS. 1 through 4, where similar reference characters denote corresponding features consistently throughout the figures, preferred embodiments are shown.

FIG. 1 illustrates a system view of a brand visibility and compliance metric quantification system for evaluating and analyzing a brand associated with an environment according to an embodiment herein. The system view includes an image capturing device 104, and the brand visibility and compliance metric quantification system 106. The image capturing device 104 obtains the image of an environment 102. The brand visibility and compliance metric quantification system 106 is communicatively connected to the image capturing device 104. The brand visibility and compliance metric quantification system 106 provides a brand visibility, attraction score and compliance metric from with respect to a brand associated within an environment to a user 108. In one embodiment, the brand visibility and compliance metric quantification system 106 may be a mobile phone, a kindle, a PDA (Personal Digital Assistant), a tablet, a music player, a computer, an electronic notebook or a smartphone. The brand visibility and compliance metric quantification system 106 includes a memory and a processor. The image capturing device 104 captures a media content from the environment. The brand visibility and compliance metric quantification system 106 generates a database of media content associated with the environment. In an embodiment, the media content includes at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment. The brand visibility and compliance metric quantification system 106 determines a location of a plurality of assets and a type of each of the plurality of assets within the media content associated with the environment. The brand visibility and compliance metric quantification system 106 includes a deep neural networking model to determine a brand from each of the plurality of assets and determines at least one object from the brand associated with each of the plurality of assets. The brand visibility and compliance metric quantification system 106 determines at least one attribute of the at least one determined object associated with the brand within the environment using a deep neural networking model. The at least one object may includes at least one of a brand name, a brand logo, a text, a product or a brand-specific object. The at least one attribute may include a color, a color contrast, a location of the object, a text size, or a number of words in the text. The brand visibility and compliance metric quantification system 106 implements at least one compliance rule to the at least one attribute of the at least one object to determine at least one of a placement of the brand in the asset, a placement of the brand along with other brands in the asset, a number of words in the text, a size of the brand logo or the brand name, a location of the brand logo or the brand name, a color contrast of the brand with respect to the environment, or a distinctness of the brand.

In an embodiment, the media content comprising the video of the asset or the video of at least one of the physical retail store environments, the digital retail store environment, the virtual reality store environment, the social media environment or the web page environment is parsed to extract one or more images.

In an embodiment, the neural networking model is a machine learning technique that is designed to recognize and interpret the data through a machine perception, a labeling and by clustering the raw data. The neural networking model is trained to interpret the raw data by providing a collection of data as an input. The neural networking model is trained to perform the task with the processor.

The neural networking model is trained by providing a collection of a user's eye movement on the media content within the environment in which the media content is placed using a headset and a recorded video with corresponding eye movement of the user. The user's eye movement includes an eye fixation, an amount of eye fixation and a sequence of eye fixation. In an embodiment, the eye movement of a plurality of users on the media content is collected by tracking the eye movement of the plurality of user's visiting a single or multi brand environment. The eye movement of the plurality of user's visiting the single or multi brand environment may be tracked using a headset or a virtual reality headset. The headset records a video for the plurality of user's visiting the single or multi brand environment. The recorded video includes the eye movement synchronized with the video for each of the plurality of the users visiting the single or multi brand environment. A fixed image of the media content is taken from the recorded video containing the eye movement of each of the plurality of users visiting the single or multi brand environment. The fixed image of the media content associated with the environment includes a plurality of pixels. The plurality of pixel of the fixed images of the media content within the environment may be colored with a plurality of different colors. The plurality of different color may signify a different amount of heat on the media content within the environment. Based on the different amount of heat on the image of the media content, the brand visibility and compliance metric quantification system 106 generates the attention heatmap of the corresponding image of the media content with respect to the environment in which the media content is placed. The plurality of pixels may be marked with a different sequence number. Using different sequence number, the brand visibility and compliance metric quantification system 106 generates the attention sequence for the corresponding image of the media content. The attention sequence is superimposed with the attention heatmap. The superimposition of the attention sequence to the attention heatmap provides a higher weight to a pixel of the image of the brand within the environment which catches the attention of the maximum number of the users from the plurality of users visiting the plurality of the physical retail store environment. The brand visibility and compliance metric quantification system 106 determines a brand visibility and a compliance metric for the brand within the environment. The determination of the brand visibility and the compliance metric comprising (a) determining a number of brands in each of the plurality of asset, (b) determining an area occupied by each brand in the plurality of asset, (c) computing a compliance score for displaying the brand within the environment using on the at least one compliance rule, and (d) computing an attraction score and the brand visibility for the brand based on the attention sequence and the heatmap obtained corresponding to the media content.

Figure 2:
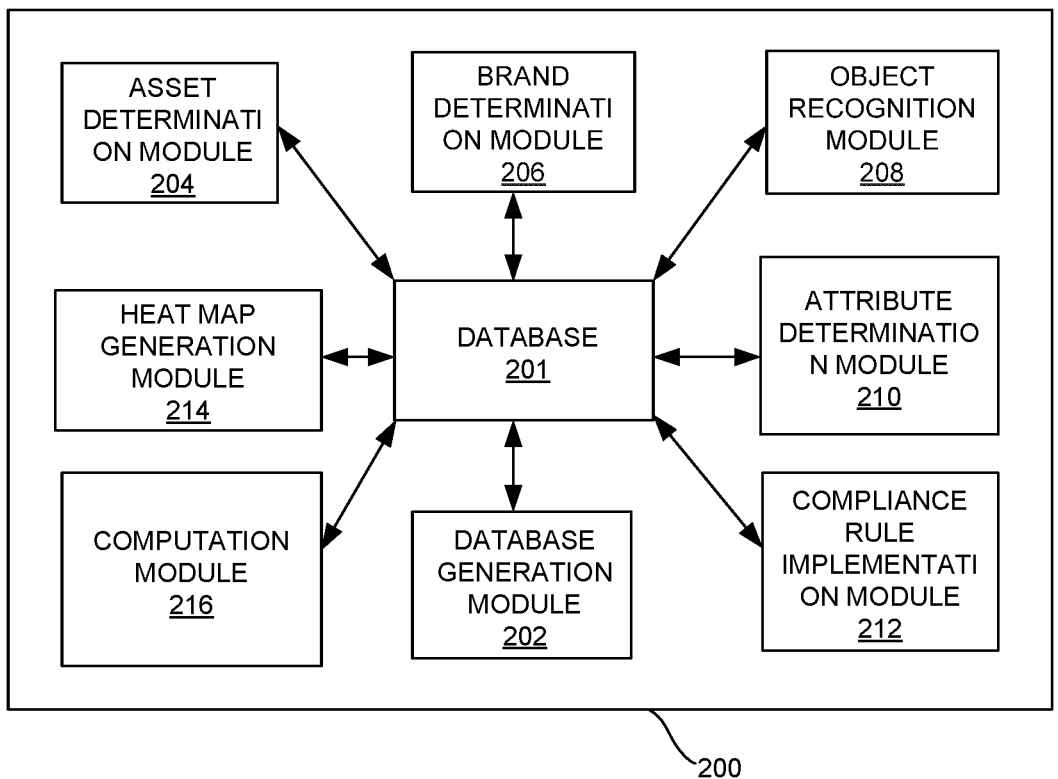
FIG. 2 is an exploded view of the brand visibility and a compliance metric qualification system of FIG. 1 according to an embodiment herein.

FIG. 2 is an exploded view of the brand visibility and a compliance metric qualification system 106 of FIG. 1 according to an embodiment herein. The brand visibility and a compliance metric qualification system 104 includes a database 201, a database generation module 202, an asset determination module 204, a brand determination module 206, an object recognition module 208, an attribute determination module 210, a compliance rule implementation module 212, a heatmap generation module 214 and a computation module 216. The brand visibility and a compliance metric qualification system 104 receives a media content to analyze and recognize the plurality of assets in an environment within the media content. The media content may be stored in the database 201 of a memory. The database generation module 202 generates the database 201 with media content associated with the environment. In an embodiment, the media content is captured using a camera or a virtual reality device. The media content may include at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment. The asset determination module 204 determines (i) a location of a plurality of assets within the media content associated with the environment, and (ii) a type of each of the plurality of assets within the media content.

The brand determination module 206 determines a brand from each of the plurality of assets using a deep neural networking model. The object recognition module 208 determines at least one object from the brand associated with each of the plurality of assets. The at least one object includes at least one of a brand name, a brand logo, a text, a product or a brand-specific object. The deep neural networking model is trained using a plurality of design creatives taken at a plurality of instances corresponding to a plurality of brands. The attribute determination module 210 determines at least one attribute of the at least one determined object associated with the brand within the environment using the deep neural networking model. In an embodiment, the at least one attribute includes a color, a color contrast, a location of the object, a text size, or a number of words in the text. The compliance rule implementation module 212 implements at least one compliance rule to the at least one attribute of the at least one object to determine at least one of a placement of the brand in the asset, a placement of the brand along with other brands in the asset, a number of words in the text, a size of the brand logo or the brand name, a location of the brand logo or the brand name, a color contrast of the brand with respect to the environment, or a distinctness of the brand. In an embodiment, the at least one compliance rule comprises a placement compliance rule, a location compliance rule, a text compliance rule, a color compliance rule, or a size compliance rule. The heatmap generation module 214 generates an attention sequence and an attention heatmap for the media content associated with the environment using the deep neural networking model. The attention sequence includes a sequence number for a plurality of pixel in the media content and the heatmap includes a heat for a plurality of different color of the plurality of pixels in the media content. The computation module 216 automatically determines a brand visibility and a compliance metric for the brand within the environment. The computation module 216 determines the brand visibility and the compliance metric by (a) determining a number of brands in each of the plurality of asset, (b) determining an area occupied by each brand in the plurality of asset, (c) computing a compliance score for displaying the brand within the environment using on the at least one compliance rule, and (d) computing an attraction score and the brand visibility for the brand based on the attention sequence and the heatmap obtained corresponding to the media content. In an embodiment, the one or more modules comprises a parsing module that automatically extracts a plurality of images by parsing the media content when the media content comprises the video of the asset or the video of at least one of the physical retail store environments, the digital retail store environment, the virtual reality store environment, the social media environment or the web page environment.

In an embodiment, the brand determination module 206 uses the deep neural networking model to recognize a brand from each of the plurality of assets. The neural networking model is trained a plurality of design creatives taken at a plurality of instances corresponding to a plurality of brands. In another embodiment, the plurality of instances includes images of the design creative taken from a plurality of angles. The plurality of angles includes a front view, a back view, a rear view and a side view of the design creative.

In another embodiment, the attribute determination module 210 detects and recognizes at least one attribute of the at least one determined object associated with the brand within the environment. The at least one attribute includes a color of the detected object associated with the brand or a color of the brand, a color contrast of the detected object associated with the brand in context of the color of the corresponding brand on which the object is detected, a location of the detected object associated with the brand, a size of the object and number of words in the object when the object is a text. In an embodiment, the compliance rule implementation module 212 determines whether the recognized attribute of the object is in accordance with the standard marketing rules. The compliance rule includes a placement compliance rule, a location compliance rule, a text compliance rule, a color compliance rule, or a size compliance rule. In one embodiment, the text compliance determines whether a size and a number of words in the text are in accordance with the marketing rules. The size compliance may determine whether a size of the plurality of objects associated with the brand is in accordance with the marketing rules. The color compliance may determine whether a color of the detected object associated with the brand or the color of the brand and the color contrast of the detected object associated with the brand in context of the color of the corresponding brand on which the object is detected is in accordance with the marketing rules. The location compliance may determine whether a location of the detected object associated with the brand is in accordance with the marking rules. The placement compliance may determine whether a placement of the brand associated with each of the plurality of assets is in accordance with the marking rules.

The compliance rule implementation module 212 determines an effectiveness and a distinctiveness of the brand associated with each of the plurality of assets with respect to the environment in which it is placed. In an embodiment, the neural network model is trained to generate the attention heatmap and the attention sequence by inputting the plurality of the media content. The plurality of the media content may include a user's eye movement when the media content is the image of the design creative, the video of the design creative, the shelf design creative, the point of sale material creative or the digital advertisement creative. The user's eye movement includes an eye fixation, an amount of eye fixation and a sequence of eye fixation.

In an embodiment, the computation module 216 automatically determines the brand visibility and a compliance metric for the brand within the environment. The compliance score is presented to the user 108 for displaying the brand within the environment using on the at least one of the compliance rules. The attraction score and the brand visibility for the brand based on the attention sequence and the heatmap obtained corresponding to the media content is presented to the user 108. The user 108 may access the brand visibility and a compliance metric for the brand within the environment through an interface associated with the user's device. In an embodiment, the computation module 216 determines a brand visibility score based on the importance/weight/significance of the marketing slot where the marketing material is displayed. In an embodiment, the brand visibility and a compliance metric qualification system 106 performs a competitive analysis of brand visibility with respect to multiple brands.

Figure 3A:
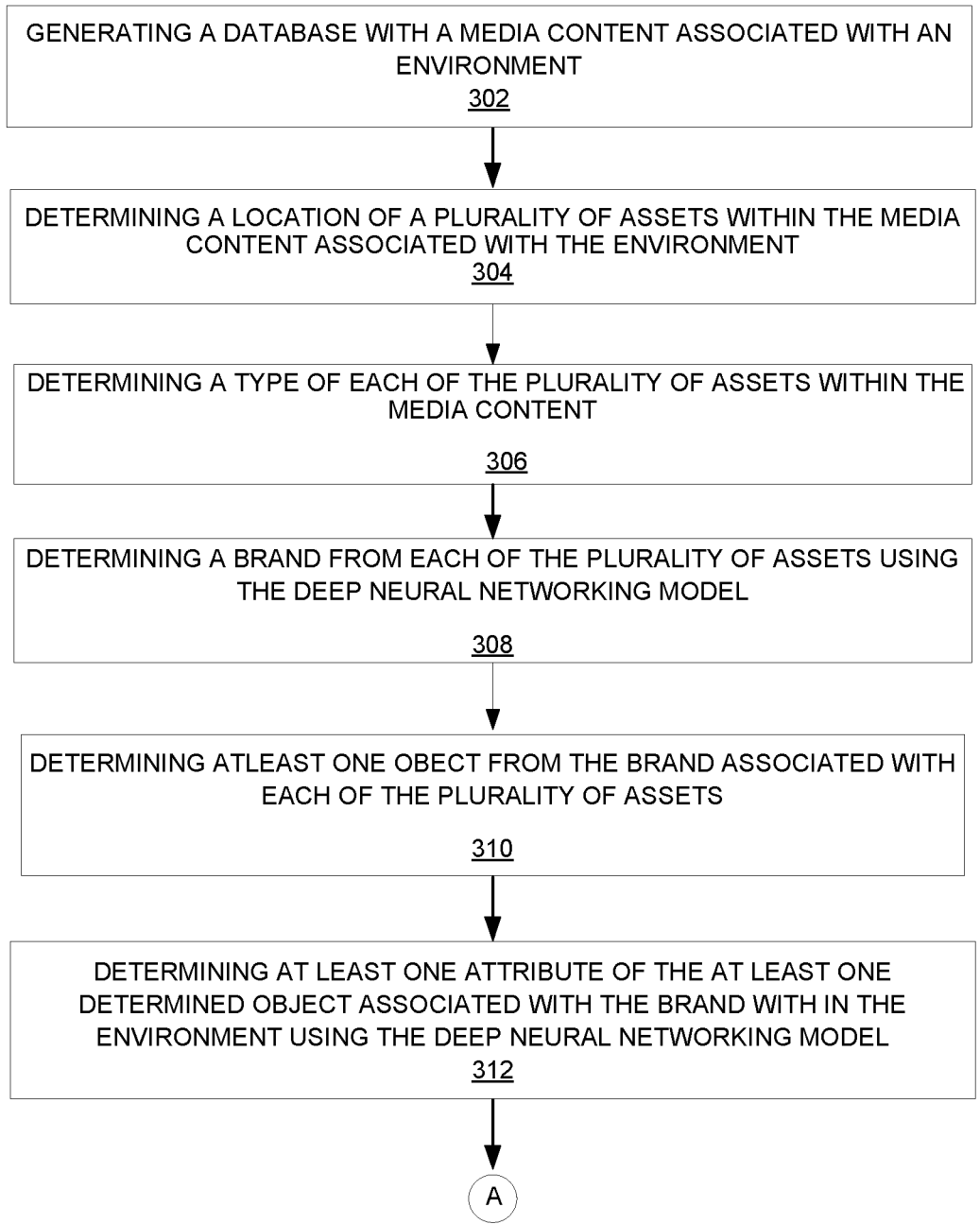
FIG. 3A and FIG. 3B are flow diagrams that illustrates a method of determining brand visibility and compliance metric for a brand in the environment using the brand visibility and compliance metric quantification system of FIG. 1 according to an embodiment herein.
Figure 3B:
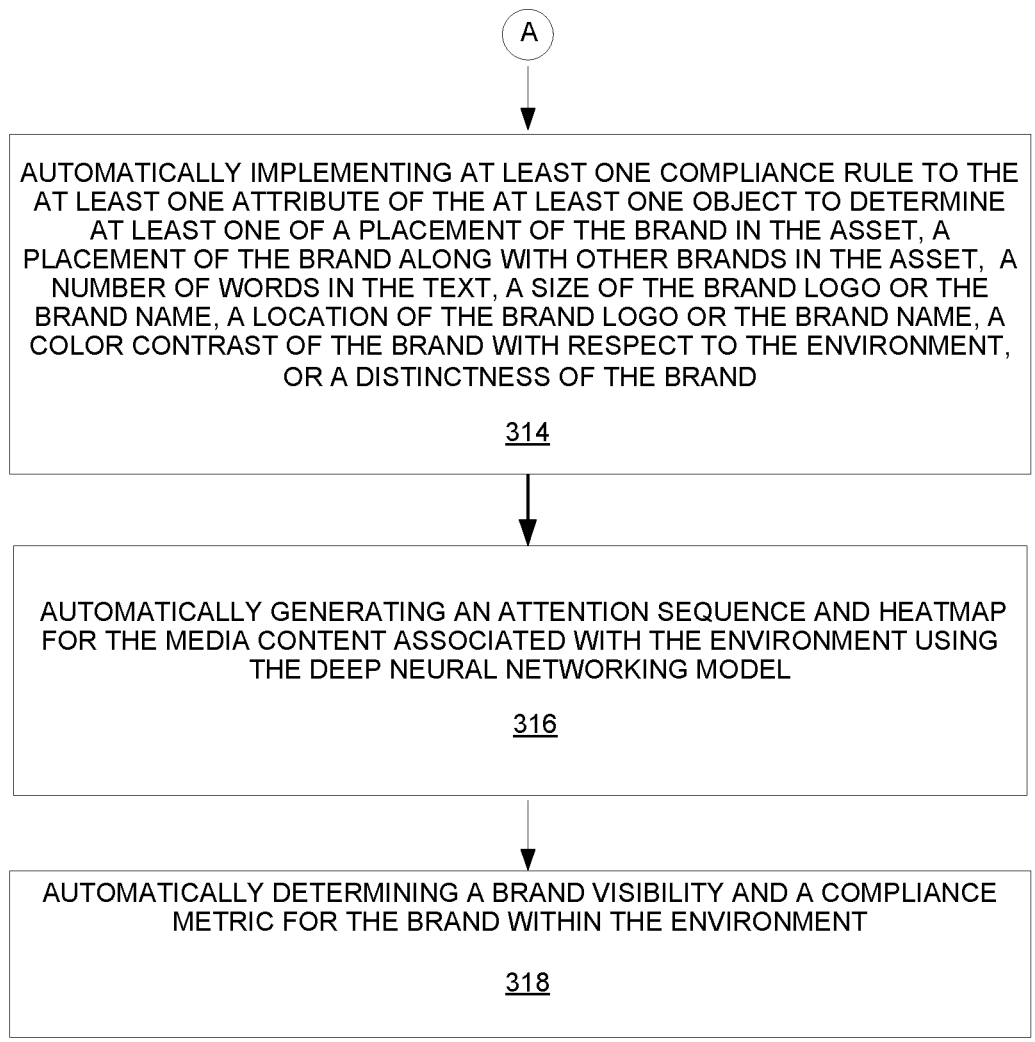

FIG. 3A and FIG. 3B are flow diagrams that illustrates a method of determining brand visibility and compliance metric for a brand in the environment using the brand visibility and compliance metric quantification system of FIG. 1 according to an embodiment herein. At step 302, a database of a media content associated with an environment is generated. At step 304, a location of the plurality of assets within the media content associated with the environment is determined. At step 306, a type of each of the plurality of assets within the media content is determined. At step 308, a brand from each of the plurality of asset is determined using the deep neural networking model. At step 310, the at least one object from the brand associated with each of the plurality of assets is determined. At step 312, the at least one attribute of the at least one determined object associated with the brand within the environment is determined using the deep neural networking model. At step 314, the at least one compliance rule is implemented to the at least one attribute of the at least one object to determine at least one of a placement of the brand in the asset, a placement of the brand along with other brands in the asset, a number of words in the text, a size of the brand logo or the brand name, a location of the brand logo or the brand name, a color contrast of the brand with respect to the environment, or a distinctness of the brand. At step 316, an attention sequence and heatmap for the media content associated with the environment is generated using the deep neural networking model. At step 318, a brand visibility and a compliance metric for the brand within the environment is determined. The the brand visibility and the compliance metric is determined by (a) determining a number of brands in each of the plurality of asset, (b) determining an area occupied by each brand in the plurality of asset, (c) computing a compliance score for displaying the brand within the environment using on the at least one compliance rule, and (d) computing an attraction score and the brand visibility for the brand based on the attention sequence and the heatmap obtained corresponding to the media content.

In an embodiment, the media content is captured using a camera or a virtual reality device, wherein the media content comprises at least one of an image of an asset, a video of an asset, a shelf brand display, a point of sale brand display, a digital advertisement display or an image, a video or a three-dimensional model of at least one of a physical retail store environment, a digital retail store environment, a virtual reality store environment, a social media environment or a web page environment. The at least one object comprises at least one of a brand name, a brand logo, a text, a product, or a brand specific object. The deep neural networking model may be trained using a one or more design creatives taken at one or more instances corresponding to one or more brands. The at least at least one attribute comprises a color, a color contrast, a location of the object, a text size, or a number of words in the text. The at least one compliance rule may include at least one of a placement compliance rule, a location compliance rule, a text compliance rule, a color compliance rule, or a size compliance rule. The attention sequence may include a sequence number for one or more pixel in the media content and the heatmap may include a heat for one or more different color of the one or more pixels in the media content. In an embodiment, the media content comprising the video of the asset or the video of at least one of the physical retail store environments, the digital retail store environment, the virtual reality store environment, the social media environment or the web page environment is parsed to extract a plurality of images. In an embodiment, the media content is converted into a three-dimensional model when the media content is received from the digital retail store environment or the virtual reality store environment. In an embodiment, the media content comprises an image or a video or three-dimensional model associated with at least one of an inside or an outside of the environment.

Figure 4:
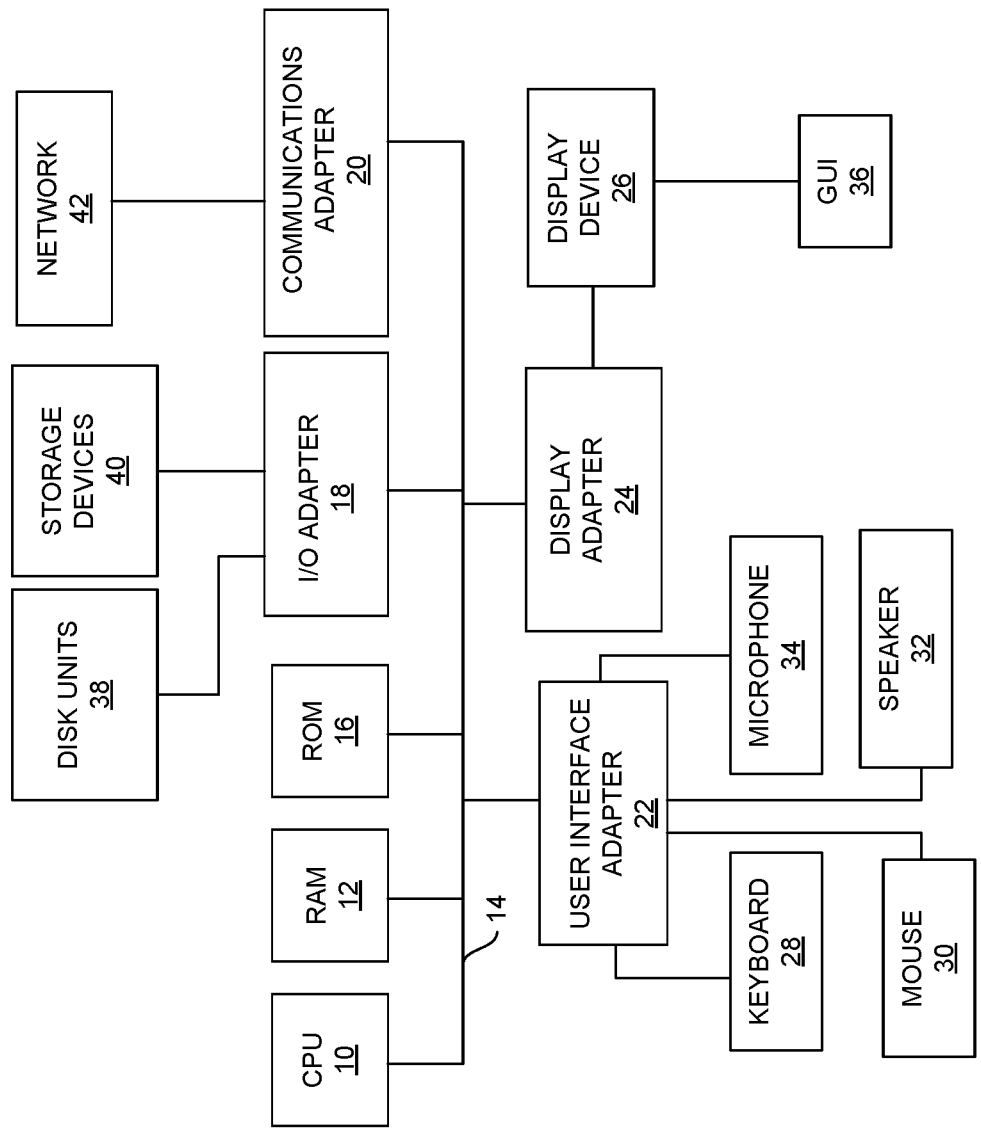
FIG. 4 is a schematic diagram of a computer architecture in accordance with the embodiments herein.

A representative hardware environment for practicing the embodiments herein is depicted in FIG. 4, with reference to FIGS. 1 through 3. This schematic drawing illustrates a hardware configuration of a server/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A processor implemented method of automatically generating an attention sequence and heatmap for media content associated with an environment, wherein the method comprising:
   training a first deep neural networking model trained by providing a collection of eye movements of a user on media content that is captured using a camera or a virtual reality device to automatically determine at least one attribute of at least one object using the first deep neural networking model, wherein the at least one attribute comprises a color, a color contrast, a location of the object, a text size, or a number of words in the text;
   training a second deep neural networking model based on eye movement of a user captured using a camera or a headset, wherein the eye movement comprises at least one of an eye fixation, an amount of eye fixation and a sequence of eye fixation; and
   automatically generating an attention sequence and heatmap for the media content associated with the environment using the second deep neural networking model, wherein attention sequence comprises a sequence number for a plurality of pixel in the media content and the heatmap comprises a heat for a plurality of different color of the plurality of pixels in the media content.

2. The processor implemented method as claimed in claim 1, wherein the method further comprises automatically extracting a plurality of images by parsing the media content when the media content comprises the video of the asset or the video of at least one of the physical retail store environments, the digital retail store environment, the virtual reality store environment, the social media environment or the web page environment, wherein the media content comprises at least one of an image of the asset, a video of the asset, a shelf brand display, a point of sale brand display, a digital advertisement display or an image, a video or a three-dimensional model of at least one of a physical retail store environment, a digital retail store environment, a virtual reality store environment, a social media environment or a web page environment.

3. The processor implemented method as claimed in claim 1, wherein the at least one object is determined by
automatically determining a location of a plurality of assets within the media content associated with the environment;
automatically determining a type of each of the plurality of assets within the media content;
automatically determining, using a deep neural networking model, the brand from each of the plurality of assets; and
automatically determining at least one object from the brand associated with each of the plurality of assets, wherein at least one object comprises at least one of a brand name, a brand logo, a text, a product, or a brand specific object,
wherein the deep neural networking model is trained using a plurality of design creatives taken at a plurality of instances corresponding to a plurality of brands.

4. The processor implemented method as claimed in claim 1, wherein the attention sequence is generated using the numbering of each pixel of media content, and wherein the attention heatmap is generated using different heat colors of the plurality of pixels in the media content associated with the environment.

5. The processor implemented method as claimed in claim 1, wherein the media content is converted into a three-dimensional model when the media content is received from the digital retail store environment or the virtual reality store environment.

6. The processor implemented method as claimed in claim 1, wherein at least one compliance rule comprises at least one of a placement compliance rule, a location compliance rule, a text compliance rule, a color compliance rule, or a size compliance rule.

7. The processor implemented method as claimed in claim 1, wherein the media content comprises an image or a video or three-dimensional model associated with at least one of an inside or an outside of the environment.

8. One or more non-transitory computer readable storage mediums storing instructions, which when executed by a processor, causes automatically generating an attention sequence and heatmap for media content associated with an environment, by performing the steps of:
training a first deep neural networking model trained by providing a collection of eye movements of a user on media content that is captured using a camera or a virtual reality device to automatically determine at least one attribute of at least one object using the first deep neural networking model, wherein the at least one attribute comprises a color, a color contrast, a location of the object, a text size, or a number of words in the text;
training a second deep neural networking model based on eye movement of a user captured using a camera or a headset, wherein the eye movement comprises at least one of an eye fixation, an amount of eye fixation and a sequence of eye fixation; and
automatically generating an attention sequence and heatmap for the media content associated with the environment using the second deep neural networking model, wherein attention sequence comprises a sequence number for a plurality of pixel in the media content and the heatmap comprises a heat for a plurality of different color of the plurality of pixels in the media content.

9. The one or more non-transitory computer readable storage mediums storing instructions as claimed in claim 8, when executed by the processor, further causes automatically extraction of a plurality of images by parsing the media content when the media content comprises the video of the asset or the video of at least one of the physical retail store environments, the digital retail store environment, the virtual reality store environment, the social media environment or the web page environment, wherein the media content comprises at least one of an image of the asset, a video of the asset, a shelf brand display, a point of sale brand display, a digital advertisement display or an image, a video or a three-dimensional model of at least one of a physical retail store environment, a digital retail store environment, a virtual reality store environment, a social media environment or a web page environment.

10. The one or more non-transitory computer readable storage mediums storing instructions as claimed in claim 8, wherein the at least one object is determined by
automatically determining a location of a plurality of assets within the media content associated with the environment;
automatically determining a type of each of the plurality of assets within the media content;
automatically determining, using a deep neural networking model, the brand from each of the plurality of assets; and
automatically determining at least one object from the brand associated with each of the plurality of assets, wherein at least one object comprises at least one of a brand name, a brand logo, a text, a product, or a brand specific object,
wherein the deep neural networking model is trained using a plurality of design creatives taken at a plurality of instances corresponding to a plurality of brands.

11. The one or more non-transitory computer readable storage mediums storing instructions as claimed in claim 8, wherein the attention sequence is generated using the numbering of each pixel of media content, and wherein the attention heatmap is generated using different heat colors of the plurality of pixels in the media content associated with the environment.

12. The one or more non-transitory computer readable storage mediums storing instructions as claimed in claim 8, wherein the media content is converted into a three-dimensional model when the media content is received from the digital retail store environment or the virtual reality store environment.

13. The one or more non-transitory computer readable storage mediums storing instructions as claimed in claim 8, wherein at least one compliance rule comprises at least one of a placement compliance rule, a location compliance rule, a text compliance rule, a color compliance rule, or a size compliance rule.

14. The one or more non-transitory computer readable storage mediums storing instructions as claimed in claim 8, wherein the media content comprises an image or a video or three-dimensional model associated with at least one of inside or outside of the environment.

15. A system for automatically generating an attention sequence and heatmap for media content associated with an environment, the system comprising:

a memory that stores a database (201) and a set of modules;

a device processor that executes:

training a first deep neural networking model trained by providing a collection of eye movements of a user on media content that is captured using a camera or a virtual reality device to automatically determine at least one attribute of at least one object using the first deep neural networking model, wherein the at least one attribute comprises a color, a color contrast, a location of the object, a text size, or a number of words in the text;

training a second deep neural networking model based on eye movement of a user captured using a camera or a headset, wherein the eye movement comprises at least one of an eye fixation, an amount of eye fixation and a sequence of eye fixation; and automatically generating an attention sequence and heatmap for the media content associated with the environment using the second deep neural networking model, wherein attention sequence comprises a sequence number for a plurality of pixel in the media content and the heatmap comprises a heat for a plurality of different color of the plurality of pixels in the media content.

16. The system as claimed in claim 15, wherein the one or more modules comprises a parsing module that automatically extracts a plurality of images by parsing the media content when the media content comprises the video of the asset or the video of at least one of the physical retail store environments, the digital retail store environment, the virtual reality store environment, the social media environment or the web page environment.

17. The system as claimed in claim 15, wherein the deep neural networking model is trained using a plurality of design creatives taken at a plurality of instances corresponding to a plurality of brands.

18. The system as claimed in claim 15, wherein the heatmap generation module (214) generates (a) the attention sequence using the numbering of each pixel of media content, and (b) the attention heatmap using different heat colors of the plurality of pixels in the media content associated with the environment.

19. The system as claimed in claim 15, wherein the media content is converted into a three-dimensional model when the media content is received from the digital retail store environment or the virtual reality store environment.

20. The system as claimed in claim 15, wherein at least one compliance rule comprises at least one of a placement compliance rule, a location compliance rule, a text compliance rule, a color compliance rule, or a size compliance rule.

* * * * *